UNITED STATES PATENT OFFICE.

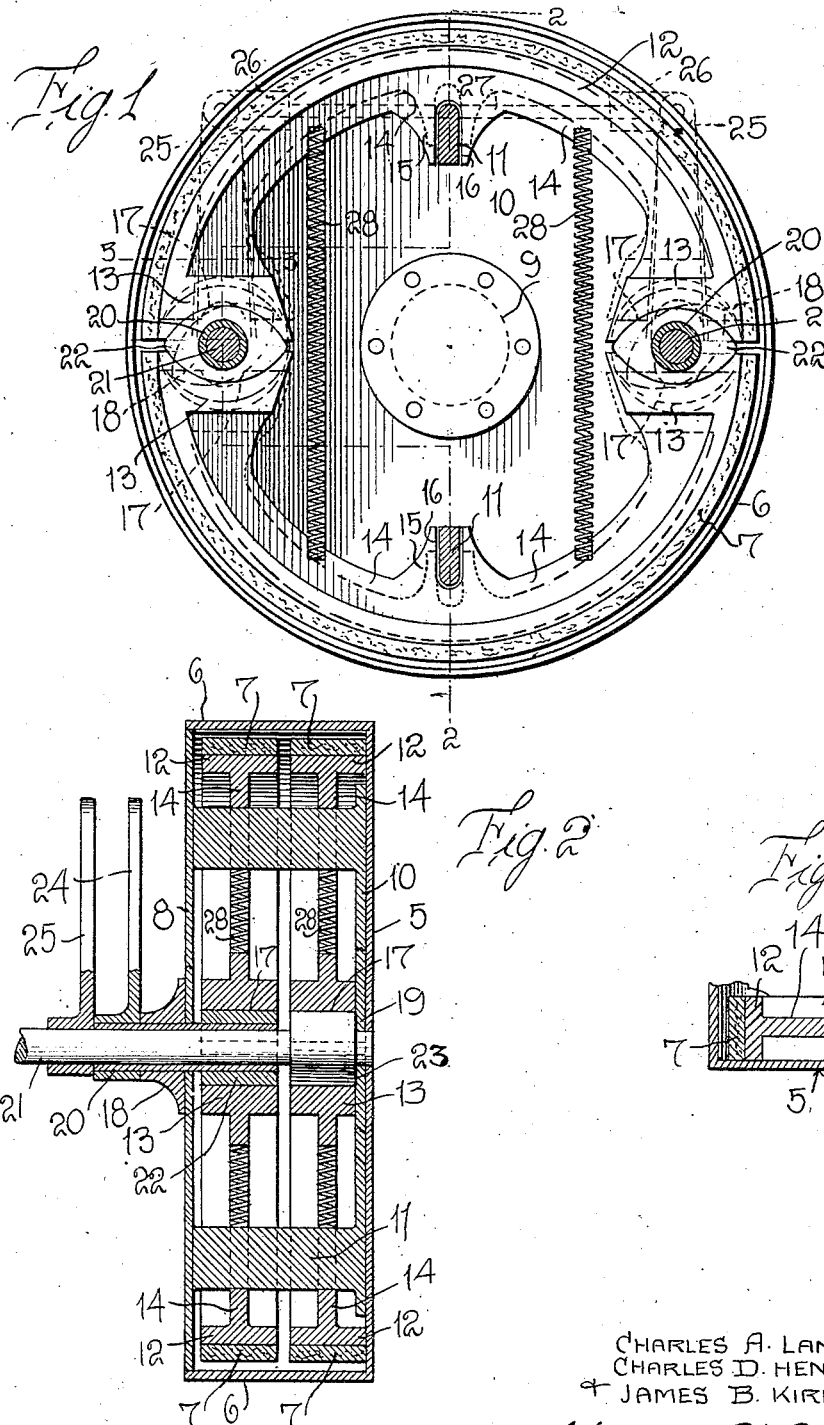

CHARLES A. LANE, CHARLES D. HENDRY, AND JAMES B. KIRKALDIE, OF ELMA, WASHINGTON.

BRAKE MECHANISM.

1,238,305. Specification of Letters Patent. Patented Aug. 28, 1917.

Application filed April 11, 1917. Serial No. 161,300.

*To all whom it may concern:*

Be it known that we, CHARLES A. LANE, CHARLES D. HENDRY, and JAMES B. KIRKALDIE, citizens of the United States, residing at Elma, in the county of Grays Harbor and State of Washington, have invented certain new and useful Improvements in Brake Mechanisms, of which the following is a specification, reference being had to the accompanying drawings.

This invention relates to improved brake mechanism and more particularly to a motor vehicle brake of the internal type wherein the brake shoes are located with the drum fixed to the vehicle wheel and are outwardly extended to exert a braking frictional pressure against the surface of the drum wall.

It is the primary object of our invention to provide a brake mechanism as above characterized, which is so constructed and operated that the braking shoes will exert a uniform frictional pressure against the wall of the brake drum.

It is a more particular object of our invention to provide pairs of brake shoes within the drum, the shoes in each pair being arranged in opposed relation and normally held yieldingly against relative outward movement, and operating mechanism to coact with the respective pairs of brake shoes whereby either one or both pairs of shoes may be expanded to exert a braking pressure upon the drum wall.

And it is also one of the detail objects of the invention to provide a brake shoe of improved construction, and means for mounting the same within the drum, whereby rupture or breakage of the parts of the mechanism due to strains consequent upon the torque occurring at the moment of application or release of the brake shoes, is obviated.

With the above and other objects in view, our invention consists in the novel features of construction, combination, and arrangement of parts to be hereinafter more fully described, claimed, and illustrated in the accompanying drawings, in which, Figure 1 is an elevation, the housing plate being removed, illustrating the preferred embodiment of our improved brake mechanism;

Fig. 2 is a section taken on the line 2—2 of Fig. 1; and

Fig. 3 is a section taken on the line 3—3 of Fig. 1.

In the accompanying drawing, 5 designates the brake drum which is bolted or otherwise rigidly fixed to the vehicle wheel, said drum having an outer annular wall or flange 6.

The inner open side of the brake drum 5 is closed by a housing plate or wall 8 which is suitably fixed to the rear axle casing, indicated at 9. A plate 10 is disposed in spaced relation to the housing wall 8 and contiguous to the inner face of the side wall of the drum 5. This plate 10 is rigidly connected to the plate 8 at diametrically opposite points by the transversely disposed metal bars 11, the purpose of which will be hereinafter fully set forth.

Each of the brake shoes consists of an arcuate bar or plate 12, the outer face of which is concentric with the wall 6 of the brake drum. The terminals of the brake shoe are enlarged, as indicated at 13, and these terminals, as well as the body of the shoe which connects the same, are provided with the facing strips 7 of felt, leather, or other frictional material for engagement with the drum wall. Between the terminals 13 of the brake shoe, said shoe is formed with an inwardly projecting web 14 on its central portion, and this web at its center is provided with an integral, inwardly projecting lug 15 having a slot 16 therein through which the bar 11 extends. The end portions 13 of the brake shoe are provided on their end faces with the concave seating surfaces 17.

At diametrically opposite sides of the axle casing, bearings 18 are secured to the outer face of the housing wall 8, and at corresponding points, bearing plates or supports 19 are secured to the plate 10. A sleeve 20 is rotatably mounted in each of the bearings 18, and a shaft 21 extends through this sleeve and is rotatable with respect thereto, said shaft being supported at its outer end in the bearing plate 19. Upon each of the sleeves 20, a substantially elliptical-shaped cam 22 is fixed, and these cams operate respectively between the opposed terminals 13 of one pair of the brake shoes. Similar cam members 23 are also fixed upon each shaft 21 for operation between the opposed ends of the other pair of brake shoes. To each sleeve 20, an arm 24 is fixed, and a similar arm 25 is also fixed to each shaft 21 beyond the end of the sleeve. The two arms 24 and the arms 25 have short bars 26 pivotally connected to their other ends, each of said bars having a threaded bore to receive the ends of the rods 27 which connect the pairs of arms or levers for simultaneous operation. Any suitable actuating connections may be provided for convenient operation by the driver, whereby the respective pairs of cam members may be actuated.

The brake shoes 12 are normally contracted and yieldingly held against relative outward movement by the coil springs 28 arranged upon opposite sides of the axle and connected at their terminals to the respective pairs of brake shoes.

In the normal condition of the brake mechanism, when the vehicle wheel has free and unretarded rotation, the cams 22 and 23 are disposed in the positions seen in Fig. 1, the concave seating faces 17 of the terminals of the brake shoes being engaged upon the longitudinally curved side faces of the elliptical cam members. When it is desired to apply a braking pressure to the drum 5, one pair of the brake shoes will be operated as, for instance, by the actuation of the lever arms 24. When these arms are moved, the sleeves 20 rotate upon the respective shafts 21, and the cams 22 will thus be rocked or turned between the opposed ends of one pair of brake shoes to position the longer axes of said cams obliquely with respect to the circumference of the brake shoes as seen in dotted lines in Fig. 1. The end portions of the cam members thus coöperate with the curved seating faces 17 of the brake shoes to move the brake shoes outwardly against the contractile action of the springs 28 and engage the outer faces of said shoes with the inner surface of the drum wall 6. At the moment of such frictional braking contact, there will be a tendency to circumferential movement of the brake shoes with respect to the drum. As the bars 11, however, remain engaged in the slots 16 of the brake shoes, when the latter are in their effective braking positions, the shoes are rigidly held against such movement and liability of rupture of the parts or displacement of the springs and high frictional wear upon the seating faces 17 is thus obviated. If additional braking pressure is desired, the other cams 23 are actuated in like manner so that the second pair of brake shoes are expanded and caused to frictionally co-act with the drum wall 6. Thus, a very high and effective braking action upon the drum is obtained so that the vehicle may be quickly brought to a stop. By the provision of the cams co-acting against the opposite ends of the opposed brake shoes, there is a uniform braking pressure applied to the drum 6 so that the same will wear evenly. The several elements of the device are very compactly arranged and the interior of the drum is entirely closed by the housing wall 8 so that dust and dirt will not enter the same. We have above referred to a particular form of the cam members which has been found highly effective and satisfactory in practical use, but it is apparent, of course, that these cam members may be of other forms whereby the brake shoes are effectively actuated. The construction of the drum, as well as the form, proportions, and relative arrangement of the several other parts, may likewise be considerably modified, and we, therefore, reserve the privilege of adopting all such legitimate changes as may be fairly embodied within the spirit and scope of the invention as claimed.

Having thus fully described our invention, what we desire to claim and secure by Letters Patent is:

1. A brake mechanism for vehicles including in combination with a brake drum, two pairs of rigid brake shoes arranged within the drum, the shoes in each pair being disposed in opposed relation to each other, and independently operable means disposed between the confronting end portions of the brake shoes in each pair to co-act therewith, whereby the shoes in either pair may be urged outwardly in relatively opposite directions to simultaneously engage all portions of their peripheral faces with the wall of the brake drum.

2. A brake mechanism for vehicles including, in combination with a drum, two pairs of brake shoes arranged within the drum, the shoes in each pair being disposed in opposed relation for engagement with the brake drum, rotatably mounted shafts disposed between the opposed ends of the brake shoes, a sleeve mounted upon each shaft and rotatable with respect thereto, a cam fixed to each shaft to co-act with the opposed ends of one pair of brake shoes, a cam fixed to each sleeve to co-act with the opposed ends of the other pair of brake shoes, means operatively connecting the sleeves to each other, and means operatively connecting the shafts to each other to simultaneously operate the corresponding cams and independently urge the brake shoes of the respective pairs outwardly into braking engagement with the drum wall.

In testimony whereof we hereunto affix our signatures in the presence of two witnesses.

CHARLES A. LANE.
CHARLES D. HENDRY.
J. B. KIRKALDIE.

Witnesses:
JOHN AVEY,
MABEL V. AVEY.